United States Patent [19]
McMahon

[11] 3,751,134
[45] Aug. 7, 1973

[54] TRACKING MOUNTS FOR CELESTIAL RAY DETECTING DEVICES

[76] Inventor: Elihu Hassell McMahon, 1870 Schieffelin Ave., Bronx, N.Y. 10466

[22] Filed: Sept. 2, 1971

[21] Appl. No.: 177,356

[52] U.S. Cl. ................................. 350/83, 350/85
[51] Int. Cl. ........................................ G02b 23/16
[58] Field of Search ............... 350/83, 85; 248/183; 33/61

[56] References Cited
UNITED STATES PATENTS

| | | | |
|---|---|---|---|
| 2,326,552 | 8/1943 | Morse | 350/85 |
| 2,922,225 | 1/1960 | Fatkin et al. | 350/85 |
| 1,118,564 | 11/1914 | Lupton | 350/83 |

FOREIGN PATENTS OR APPLICATIONS 820,166    9/1959    Great Britain ....................... 350/83

*Primary Examiner*—David H. Rubin
*Attorney*—Jacobs & Jacobs

[57] ABSTRACT

Mounting assemblies for telescopes and similar celestial ray detecting devices are described in which the polar or right ascension bearing has been eliminated and replaced by a rotatable equatorial plate assembly. The declination bearing of the telescope cradle rides on a tracking arm which is maintained parallel to the plane of the plate assembly during rotation of the latter by a following rod. A precession carriage can be provided as the telescope cradle to permit greater versatility.

12 Claims, 11 Drawing Figures

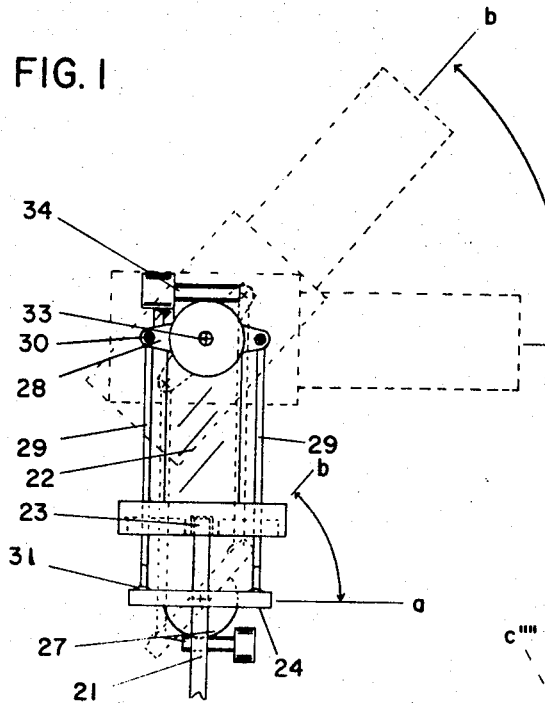
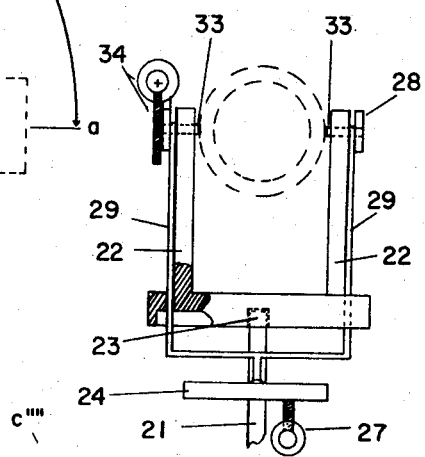
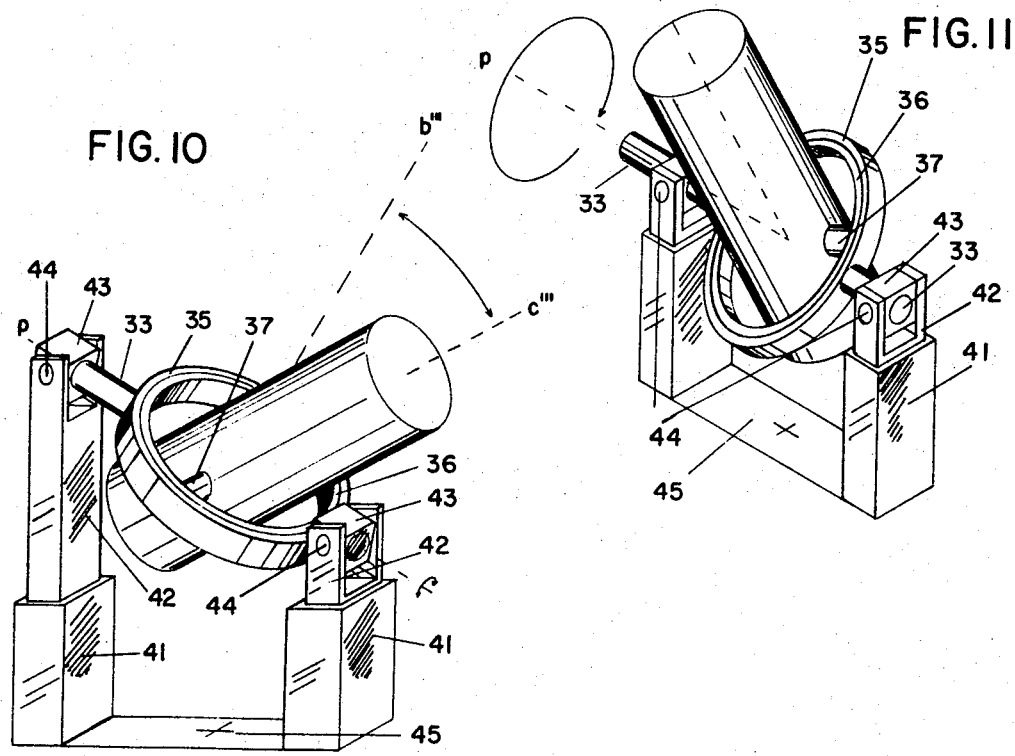
FIG. 1
FIG. 2
FIG. 10
FIG. 11

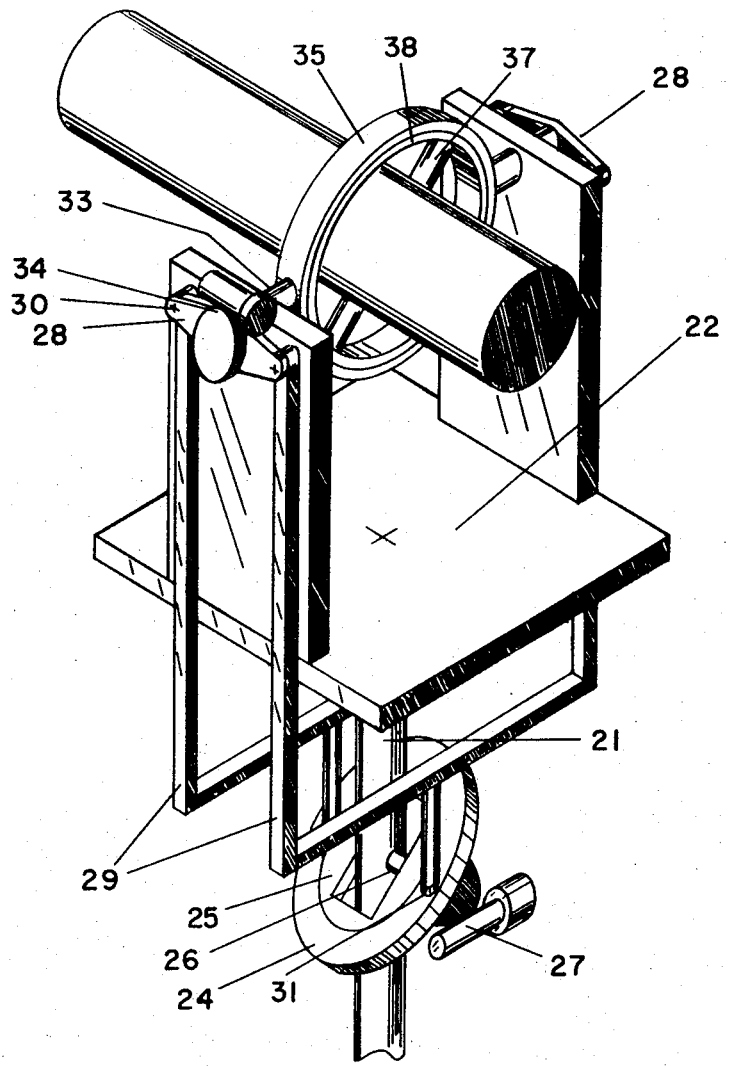

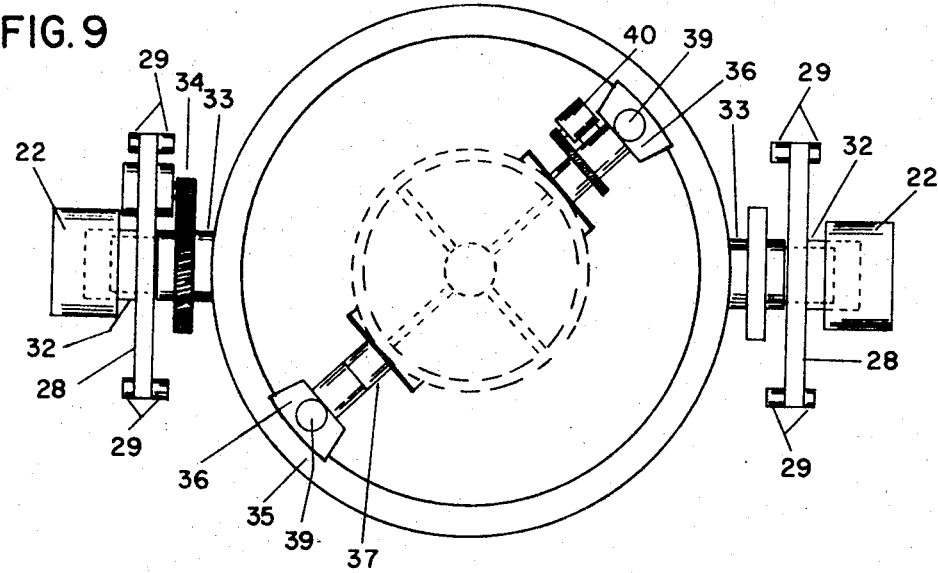
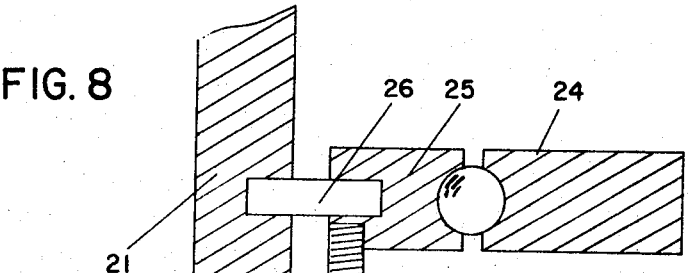
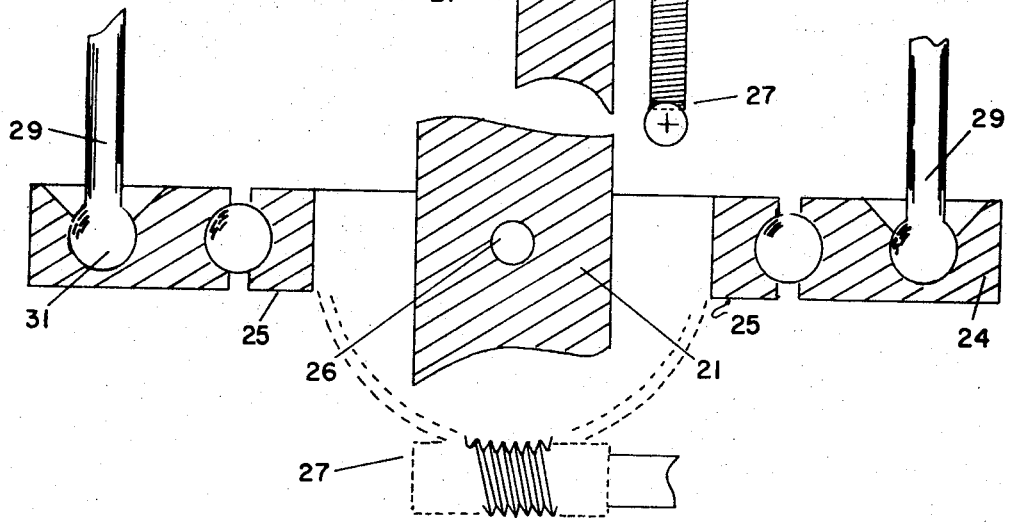

TRACKING MOUNTS FOR CELESTIAL RAY DETECTING DEVICES

DETAILED DESCRIPTION

The present application pertains to novel mounting assemblies for celestial ray detecting devices which permits tracking of heavenly bodies and celestial sources of various rays in virtually any position in the sky during rotation of the earth.

The mounting is suitable for any ray detecting device including optical telescopes, radio telescopes, spectrophotometers, telescopic cameras and the like, whether large or small. For purposes of simplicity, the following description utilizes optical telescopes as a typical ray detecting device, it being understood that the invention pertains to the mounting and not the particular device mounted thereon.

Common to all telescope mountings used for serious observational work is the presence of two axes. In the most common type of mounting, the equatorial mounting, the assembly rides on a polar or right ascension axis which is aligned in a position parallel to the axis of rotation of the earth and a declination axis set at a right angle to the polar axis.

For smaller and medium size telescopes, perhaps the most common form of mounting is the German mounting in which the bearings for the declination assembly are attached outboard of the upper bearing of the polar axis assembly and the telescope is, in turn, attached outboard of the declination axis bearing with a counterweight mounted at the opposite end of the declination shaft so as to maintain balance in all positions of rotation about the polar axis. While this type of mounting has the advantage of being fairly light, it suffers from the disadvantage that large mechanical stresses are placed on the shafts. It is therefore necessary to make the shafts sufficiently strong to resist vibration and to place the two bearings fairly well apart to ensure stability.

A second mounting assembly which eliminates the need for the counterweight and the heavy declination axis is represented by the fork mounting. In the fork mounting, the polar axis is similar to that in the German mount but the telescope is carried between the declination axis bearings in a fork through which it is swung to gain complete accessibility to the sky. Although the counterweight and heavy declination shaft have been eliminated, the fork must be of a massive structure thereby requiring a very substantial polar axis assembly to support the load. Moreover this type of mounting is not suitable for refracting telescopes or classical cassegrains since the eye piece becomes inaccessible when the telescope is tracking in the polar regions.

A third mounting, commonly known as the English mounting, carries the telescope inboard of both the declination and polar bearing in a large frame in which the telescope swings and which, in turn, rotates about the polar axis to provide right ascension. This type of construction is of great advantage in the use of large telescopes since it minimizes the suspended weight and the stresses caused by that weight. The basic disadvantage of the English mounting is that the polar regions are not visible, a serious enough drawback to have inspired two modifications: the modified English mounting in which the frame is replaced by a suspended column so that the telescope is carried inboard of the polar axis bearing but outboard of the declination axis bearings, the reverse of the fork mounting, and the horseshoe mounting having a crescent shaped upper polar axis bearing which permits access to the polar regions. The modified English mounting, although quite commonly used, has the disadvantage that a counterweight is required, as in the German mounting, while the horseshoe mounting, one of the most satisfactory forms, presents significant engineering problems.

The first objective of the present invention is to provide a telescope or similar ray detecting device mounting assembly which avoids the various problems heretofore encountered with the above described and other mountings.

A further object in conjunction with the preceding object is to provide a mounting assembly which permits tracking in all regions of the observable sky.

A further objective of the present invention is to provide a mounting assembly in which the center of gravity of the telescope or ray detecting device is disposed directly over the support throughout operation of the telescope and regardless of its positioning.

Still a further objective of the present invention is to provide a mounting assembly in which the polar axis has been eliminated and to utilize in its place an adjustable plate which is oriented in a plane parallel to that of the equatorial plane of the earth.

These and other objectives of the present invention will become apparent from the following detailed description, discussion and the appended claims, taken in conjunction with the accompanying drawings showing preferred structures and embodiments, in which:

FIG. 1 is a side elevation of one embodiment of the present invention, showing the telescope being raised from base line *a* to line *b*, this positioning corresponding to azimuth at a latitude of (90° - arc *ab*);

FIG. 2 is a front elevation of the embodiment depicted in FIG. 1, (the telescope being shown aligned along *a* in FIG. 1);

FIG. 3 is a detailed perspective of a second embodiment of the present invention depicting, in addition to the equatorial plate assembly and associated mechanism, a precession carriage assembly serving as the cradle for the telescope;

FIG. 7 is a section of the entire equatorial plate assembly, one quadrant of which is shown in FIG. 6, taken along lines 7 — 7' in FIG. 6;

FIG. 8 is a section of quadrant of the equatorial plate shown in FIG. 6 and taken along line 8 — 8';

FIG. 9 is a top elevation of a second embodiment of a telescope cradle utilizing the precession carriage;

FIG. 10 is a perspective of an alternative utilization of the precession carriage of the present invention in a configuration suitable for tracking in the equatorial regions; and FIG. 11 is a perspective of the embodiment shown in FIG. 10 but in a configuration suitable for tracking in the polar regions.

Figure 4:
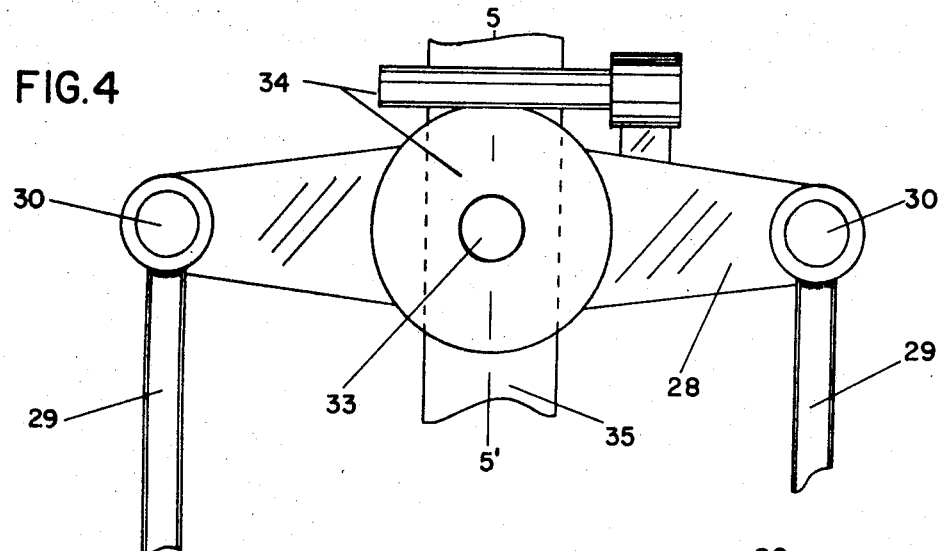
FIG. 4 is a partial cross-section in detail of the equatorial tracking arm shown in FIGS. 1, 2 and 3.

With specific reference to FIGS. 1 and 2, there is provided according to the present invention a mount having a base 21 which firmly rests upon the ground or a suitable foundation. Rotatably mounted on this base is support member 22 riding upon a suitable bearing 23 so as to be freely rotatable about a vertical axis, relative to the earth, of base 21. Although not shown, in FIGS. 1 and 2, the rotation of support member 22 relative to base 21 may be controlled by a suitable clock mechanism so as to automatically compensate for the rotation of the earth.

As shown in greater detail in FIGS. 3, 6, 7 and 8, a plate assembly comprising annular member 24 is rotatably mounted upon track 25 so as to be rotatable within the plane of track 25, track 25 in turn being pivotally mounted to base 21 through bearing 26. Through adjustment of gear means 27, the entire plate assembly is adjusted to a plane corresponding to the equatorial plane of the earth. Hence in FIG. 3, the equatorial plane is set at an angle corresponding to the complement of the latitude at which the assembly is employed. While FIGS. 1, 2, 3 and 6, 7 and 8 depict an embodiment in which the angle of the plane assembly is variable, it is apparent that for large, permanently installed installations, the equatorial plate assembly may be rigidly fixed to base 21 at the appropriate angle for the latitude of installation.

The two basic components of the rotatable plate assembly, track 25 rotatably mounted on base 21 and annular member 24 rotatably mounted on track 25, are so arranged that annular member 24 will rotate within the plane defined by the setting of track 25 relative to base 21. The center of rotation of annular member 24 lies at a point on the vertical axis of rotation of support member 22, the angle defined by the axis of rotation of support member 22 and the axis of rotation of annular member 24 corresponding to the latitude of use of the mounting assembly.

Returning to FIGS. 1 – 4, an equatorial tracking arm 28 is pivotably mounted on support member 22, the axis of rotation of the tracking arm 28 being perpendicular to the vertical axis of support member 22 and base 21. Connecting the equatorial tracking arm 28 and the annular member 24 of the rotatable plate assembly is at least one and preferably two following rods 29. Following rod 29 is pivotably mounted at one end to the equatorial tracking arm at bearing 30 (see FIG. 4) and pivotably mounted at the other end to annular member 24 of the rotatable plate assembly through joint 31 (see FIGS. 6 and 7). Ideally joint 31 is a ball and socket joint which permits the assumption of a variety of angles by the rotatable plate assembly relative to the base and at the same time, rotation of annular member 24 about track 25. In its preferred embodiment, the tracking assembly will utilize two following rods 29, the rods being pivotably mounted equidistant from the center of and on a diameter within the plane of the rotatable plate. The opposite ends of the following rods are then pivotably mounted on the equatorial tracking arm at opposing points equidistant from the center of its rotation. As a result of the parallelogrammatical mounting of following rods 29, equatorial tracking arm 28 and the rotatable plate, the equatorial tracking arm is maintained in a position parallel to the radius defined within the plane of the rotatable plate assembly by the point of mounting of the following rod during rotation of support member 22 about base 21.

Figure 5:
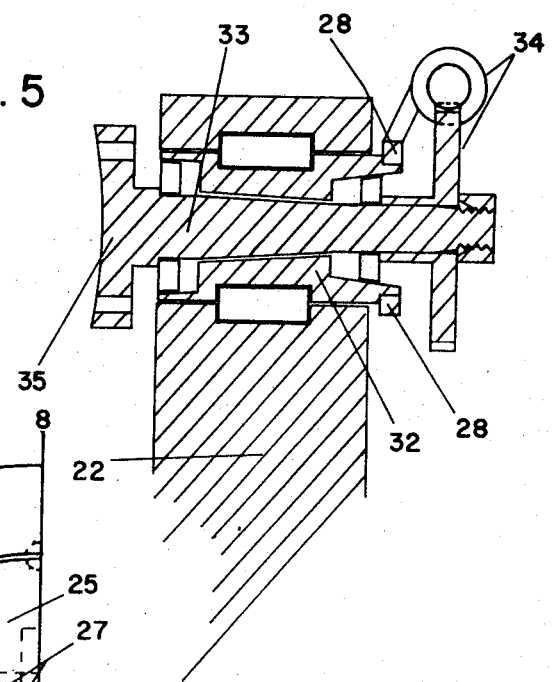
FIG. 5 is a cross-section of the double bearing assembly through which the telescope's cradle is connected to the equatorial tracking arm.
Figure 6:
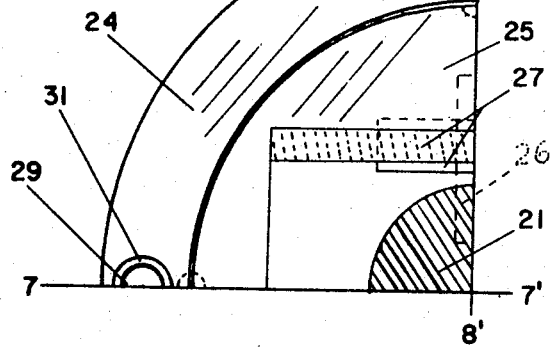
FIG. 6 is a top elevation of one quadrant of the rotatable equatorial plate assembly.

Equatorial tracking arm 28 is rotatably mounted upon support member 22 through a double bearing, shown in greater detail in FIG. 4 and particularly FIG. 5. Thus support member 22 carries a declination bearing 32 which is rotatably mounted therein and is an extension of tracking arm 28. Within the declination bearing 32 is shaft 33 of ray detecting device cradle 35, cradle 35 thus being rotatably mounted within declination bearing 32 of the equatorial arm through shaft 33. Shaft 32 is rotatably positioned relative to declination bearing 32, and thus tracking arm 28, through suitable engagement means such as worm gear 34. Cradle 35 thus assumes a given declination angle relative to equatorial tracking arm 28 and thereafter maintains that angle, relative to the equatorial tracking arm, during the movement of the tracking arm as it follows annular member 24 of the rotatable plate assembly in the course of rotation of support member 22 about its vertical axis and the concurrent rotation of annular member 24 about track 25. Consequently, once the rotatable plate assembly is placed in a position coplanar with the earth's equator and cradle 35 is raised above azimuth to the appropriate declination angle through gear means 34 relative to tracking arm 28 (which by virtue of the adjustments to plate 24 has already assumed a position parallel to the plane of earth's equator), and support member 22 is rotated about base 21, cradle 35 and the associated ray detecting device attached thereto will move in right ascension in following the ecliptic of the given body.

In its simplest embodiment, the telescope or ray detecting device is directly mounted to shaft 33 riding in declination bearing 32 through a suitable telescope cradle 35 so that the angle assumed by the telescope relative to tracking arm 28 corresponds to that assumed by cradle 35 upon adjustment of gear means 34. A significant advantage of this assembly is that the telescope can be mounted on the cradle so that its center of gravity is directly over the support and base and remains there in all positions.

A more versatile, albeit complex, assembly is depicted in FIGS. 3 and 9 in which cradle 35 forms a precession carriage which, in turn, is adapted to receive the ray detecting device. In this embodiment, the cradle comprises an annular track 35 having shaft members 33 diametrically disposed on the outside of the annular track and adapted to ride in the declination bearing 32, at least one bearing support 36 disposed within annular track 35 and adapted for coplanar rotation within it and a precession carriage 37 adapted to receive the ray detecting device and pivotably mounted on bearing support 36 along an axis lying in the plane of the annular track. The ray detecting device riding on carriage 37 can be angularly adjusted through its longitudinal axis relative to the plane of annular track 35. The bearing support may be made up of a series of trolleys, as shown in FIG. 9, or may be a concentric annular member 36, shown in FIGS. 10 and 11, which revolves within annular member 35.

Driving means 39 may be provided either on the annular track 35 or on the bearing support 36 in order to rotate the bearing support within the plane of annular track 35. In addition, driving means 40 may be provided in order to rotate precession carriage 37 within bearing support 36.

The embodiment depicted in FIGS. 3 and 9 can be utilized with both large and small telescopes. It is particularly suited however for extremely large telescopes in that driving means 39 and 40 can be coordinated with rotation of the base member and the various angles assumed by the equatorial tracking arm during the course of this rotation. Thus in a preferred embodiment, driving means 39 are coordinated with rotation of the support member 22 so that the axis of rotation of carriage 37 is always parallel to a diameter lying within the plane of rotatable member 24. Utilizing this principle, it will be observed that if the rotatable plate assembly is placed coplanar with the equatorial plane and the telescope is rotated on shaft 37 so as to assume the proper declination angle relative to the plane of annular track 35 (which is held perpendicular to equatorial tracking arm 28 and the rotatable plate assembly), subsequent rotation of support member 36 within track 35 so as to maintain the axis of shaft 37 in a position parallel to the plane of the rotatable plate assembly will define an oscillating movement during one full rotation of the rotatable plate assembly and support.

FIG. 9 also depicts a second and alternative embodiment of the double bearing shown in detail in FIG. 5. In this second embodiment, in place of a concentric bearing, tracking arm 28 is rotatably mounted on support member 22 and declination bearing 32 is in turn mounted on tracking arm 28 with shaft 33 riding in declination bearing 32.

The precession carriage depicted in FIG. 9 can also be utilized without the rotatable plate assembly discussed above. FIGS. 10 and 11 illustrate such an assembly, FIG. 10 utilizing the precession carriage of the present invention in a configuration suitable for tracking in the equatorial regions while FIG. 11 depicts a configuration suitable for tracking in the polar regions, it being understood that FIGS. 10 and 11 correspond to the same assembly. In this embodiment, the telescope is rigidly connected to carriage support 37 which is rotatably mounted in bearing support 36. Bearing support member 36 is in turn rotatably mounted for rotation in annular ring 35 having shaft members 33 diametrically disposed on the outside thereof. This entire cradle is supported on columns 41, at least one of which is adjustable in height as for example through extension of telescoping member 42, shaft 33 being rotatably mounted in universal bearing 43 which is in turn rotatably mounted on column 41 and extension 42 through bearing 44. Columns 41 can in turn be rotatably mounted on track 45 so as to permit conversion from the configuration depicted in FIG. 10 to the configuration depicted in FIG. 11.

In the configuration depicted in FIG. 10, the assembly is positioned for tracking in the equatorial regions by first placing columns 41 in a polar great circle. One of column extensions 42 is then raised so that the axis of shaft 33 ($p$) is parallel to the polar axis, the degree of extension depending upon the latitude of use. Bearing support 36 is then rotated within annular ring 35 until carriage 37 is perpendicular to the axis of shaft 33 and the telescope is then rotated on carriage 37 from azimuth position $b'''$ to the appropriate angle of declination corresponding to the arc $b'''c'''$. With these adjustments then fixed, the entire cradle including annular track 35 and the telescope is rotated on shaft 33 at a rate sufficient to compensate for the rotation of the earth.

In the configuration depicted in FIG. 10, the operation of the mount approximates that of the English mount. In contrast to the English mount however the assembly shown in FIG. 10 can be rapidly and easily converted to the configuration depicted in FIG. 11 so as to be highly suitable for tracking in the polar region. In this configuration, support columns 41 are rotated on track 45 so as to be parallel with the equator. Extensions 42 of columns 41 are then adjusted so as to be of equal height and shaft 33 is then rotated within universal bearing 43 so that annular ring 35 assumes a plane parallel with the plane of the equator. When the telescope is perpendicular to the plane of annular ring 35, it will be aligned along line $p$ which is parallel with the polar axis of the earth. The telescope is then adjusted from this perpendicular position to the appropriate declination angle corresponding to the arc $pc''''$ through rotation of carriage support 37 in bearing support 36. With maintenance of this angle, rotation of the internal annular bearing support 36 within annular ring 35 at a rate corresponding to the rate of rotation of the earth but in the opposite direction then effects precession of the telescope about the polar axis so as to permit tracking in the polar regions.

The configuration depicted in FIG. 11 can of course be realized through an assembly having a rotatable equatorial plate assembly as shown in FIGS. 1, 2 and 3. When polar tracking is performed with such an assembly, the rotatable equatorial plate is initially positioned and not rotated during tracking. It should also be observed that in the utilization of this assembly for polar tracking, and in contrast to the oscillating movement defined by bearing support 36 relative to annular ring 35 when operated in the manner discussed in connection with FIG. 9, bearing support 36 defines a complete revolution within annular track 35 in the course of precession.

The foregoing description and drawings represent typical embodiments of the present invention but are not intended as limitations on the scope thereof, it being apparent that the invention can be practiced through obvious modifications and rearrangements without departing from the essential spirit thereof.

What is claimed is:

1. A tracking mount for a celestial ray detecting device comprising
  a. a base;
  b. a support member rotatably mounted on the base for rotation about a vertical axis;
  c. a rotatable plate assembly mounted on the base and adapted so as to assume a position coplanar with the equator of the earth and to be rotatable within that plane about a point lying in the vertical axis of the support member;
  d. an equatorial tracking arm pivotably mounted on the support member along an axis perpendicular to the vertical axis of the support member;
  e. at least one following rod, said following rod pivotably mounted at one end to the equatorial tracking arm and pivotably mounted at its other end to the rotatable plate so as to maintain the equatorial tracking arm in a position parallel to the radius defined within the plane of the rotatable plate by the point of mounting of the following rod;
  f. a declination bearing on the equatorial tracking arm;
  g. a ray detecting device cradle having a shaft riding in the declination bearing, the cradle rotating coaxially through its shaft with the equatorial tracking arm, said cradle being adapted to assume a given declination angle relative to the equatorial tracking arm and thereafter maintain that angle during rotation of the support member about its vertical axis.

2. A tracking mount according to claim 1 having two following rods pivotably mounted equidistant from the center of and on a diameter within the plane of the rotatable plate assembly.

3. A tracking mount according to claim 1 wherein the rotatable plate assembly is planarly fixed relative to the vertical axis of the support member.

4. A tracking mount according to claim 1 wherein the rotatable plate assembly is pivotably mounted on the base so as to be adjustable at any given latitude to a position coplanar with the equator.

5. A tracking mount according to claim 1 wherein the rotatable plate assembly comprises a track pivotably mounted on the base and an annular member rotatably mounted on said track, said plate assembly being adjustable through gear means so as to assume a position coplanar with the equator of the earth at the latitude of use, one end of each of two following rods is pivotably mounted on the equatorial tracking arm at opposing points equidistant from the center of rotation of the tracking arm, the other end of each of the following rods is mounted through a ball and socket joint to the annular member of the rotatable plate assembly at a point equidistant from the center of and in a common diameter within the plane of the rotatable plate assembly, and said cradle is mounted through its shaft to the declination bearing of the equatorial tracking arm through gear means whereby the ray detecting device riding in said cradle can be adjusted to a given declination angle relative to the equatorial tracking arm and thereafter maintained at that angle during rotation of the support member about its vertical axis 6. A tracking mount according to claim 1 wherein the ray detecting device cradle comprises
    i. an annular track;
    ii. shaft members diametrically disposed on the outside of the annular track and adapted to ride in said declination bearing;
    iii. at least one bearing support disposed within said annular track and adapted for coplanar rotation within the annular track;
    iv. a precession carriage adapted to receive a ray detecting device and pivotably mounted on said bearing support along an axis lying in the plane of the annular track whereby the ray detecting device riding on said carriage can be angularly adjusted through its longitudinal axis relative to the plane of the annular track.

7. A tracking mount according to claim 6 wherein the bearing support is annular and disposed within said annular track for coplanar rotation.

8. A tracking mount according to claim 6 wherein said bearing support comprises at least two trolleys disposed equiangularly within said annular track for coplanar rotation.

9. A tracking mount according to claim 6 including means to coordinate the rotation of the bearing support within the annular track with the rotation of the support member whereby the axis of rotation of the precession cradle is maintained parallel to a diameter of the rotating plate.

10. A tracking mount according to claim 1 wherein the rotatable plate assembly is pivotably mounted on the base, said plate being adjustable through a gear means so as to assume a position coplanar with the equator of the earth at the latitude of use, one end of each of two following rods is pivotably mounted on the equatorial tracking arm at opposing points equidistant from the center of rotation of the tracking arm, the other end of each of the following rods is mounted through a ball and socket joint to the rotatable plate assembly at a point equidistant from the center of and in a common diameter within the plane of the rotatable plate, and said cradle comprises
    i. an annular track;
    ii. shaft members diametrically disposed on the outside of the annular track and mounted to the declination bearing of the equatorial tracking arm through a worm gear whereby said cradle can be adjusted to a given declination angle relative to the equatorial tracking arm and thereafter maintained at that angle during rotation of the support member about its vertical axis;
    iii. at least one bearing support disposed within said annular track and adapted for coplanar rotation within the annular track;
    iv. a precession carriage adapted to receive a ray detecting device and pivotably mounted on said bearing support along an axis lying in the plane of the annular track whereby the ray detecting device riding on said carriage can be angularly adjusted through its longitudinal axis relative to the plane of the annular track.

11. In a mounting for a ray detecting device the improvement which comprises
    i. a pair of support columns;
    ii. an annular track, said track having shaft members diametrically disposed on the outside of the track and said shaft members being rotatably mounted on said support columns;
    iii. at least one bearing support disposed within said annular track and adapted for coplanar rotation within the annular track;
    iv. a precession carriage adapted to receive a ray detecting device and pivotably mounted on said bearing support along an axis lying in the plane of the annular track whereby the ray detecting device riding on said carriage can be angularly adjusted through its longitudinal axis relative to the plane of the annular track.

12. The improvement in a mounting according to claim 11 characterized in that one of the support columns is adjustable in height whereby the axis of rotation of said annular track on said support columns can be angularly varied.

* * * * *